United States Patent
Whitmyer, Jr.

(10) Patent No.: US 7,921,139 B2
(45) Date of Patent: Apr. 5, 2011

(54) SYSTEM FOR SEQUENTIALLY OPENING AND DISPLAYING FILES IN A DIRECTORY

(75) Inventor: Wesley W. Whitmyer, Jr., Stamford, CT (US)

(73) Assignee: WhitServe LLC, Stamford, CT (US)

( * ) Notice: Subject to any disclaimer, the term of this patent is extended or adjusted under 35 U.S.C. 154(b) by 705 days.

(21) Appl. No.: 11/566,043

(22) Filed: Dec. 1, 2006

(65) Prior Publication Data

US 2008/0134028 A1 Jun. 5, 2008

(51) Int. Cl.
*G06F 7/00* (2006.01)
*G06F 17/30* (2006.01)

(52) U.S. Cl. .................. 707/802; 707/805

(58) Field of Classification Search .............. 707/2, 3, 707/4, 100, 101, 102, 200; 703/27; 709/203, 709/205; 705/26

See application file for complete search history.

(56) References Cited

U.S. PATENT DOCUMENTS

| 5,918,039 A * | 6/1999 | Buswell et al. ............ 703/27 |
| 2003/0009391 A1* | 1/2003 | Nabb et al. ............ 705/26 |
| 2004/0093378 A1* | 5/2004 | Warnock ............ 709/203 |

* cited by examiner

*Primary Examiner* — Etienne P LeRoux
*Assistant Examiner* — Susan Y Chen
(74) *Attorney, Agent, or Firm* — St. Onge Steward Johnston & Reens LLC

(57) ABSTRACT

A system for sequentially opening and displaying files in a directory, including a processor, at least one directory including a plurality of electronic files, software executing on the processor for receiving a request to open and display a first one of the plurality of electronic files, software executing on the processor for receiving a next file request, and software executing on the processor for opening a next file in the at least one directory upon receiving the next file request.

23 Claims, 6 Drawing Sheets

SYSTEM FOR SEQUENTIALLY OPENING AND DISPLAYING FILES IN A DIRECTORY

FIELD OF THE INVENTION

The invention relates to electronic file systems and directories, and more specifically to a system and method for sequentially opening and displaying electronic files in directories.

BACKGROUND OF THE INVENTION

Computer and/or electronic files are typically organized using directories which associate file names with files, often by connecting the file name to an index in a file system or the like. Directories are often hierarchical and may contain any number of subdirectories. A directory may organize electronic files on a server, hard disk, portable media or any other storage means. Further, a directory may be a virtual directory for organizing and accessing files in any number of remote or distributed sources.

Directories and subdirectories allow users to organize and group electronic files (e.g., by topic, client, matter, etc.) so they may be more quickly located. However, difficulties still arise when attempting to locate a particular file within a subdirectory or folder having numerous files. Users must generally subscribe to a particular file naming convention to allow a desired file to be readily recognizable. For example, a user may include any one of a file description, client, author and/or date in a file name so it may be easily recognized in the directory. Additional naming conventions are often necessary for multiple versions of the same file (e.g., file1-revA.doc, etc.).

File management systems or managed directories may be employed to assist in identifying files in directories. Generally file management systems provide an interface for users to search, open and edit a specific electronic file based on a user provided title, keywords or other file criteria. The file management system associates the title and keywords with a particular file in a directory. However, the actual file name of each particular file is often an unintelligible collection of numbers and/or letters assigned by the file management system. Therefore, should a user need to access the directory and/or file location directly, a file can only be located by manually opening and viewing each and every of file of the desired type in the directory until the desired file is found.

Some preview applications are also available for users to preview a representation or thumbnail of certain electronic files in a directory. For example, Microsoft Windows Explorer provides thumbnails and a "Filmstrip" function for viewing image files in a directory folder. Filmstrip arranges thumbnails of the images along the bottom of an Explorer window, with the currently-selected image in a larger preview above it. A user may then selectively view enlarged thumbnails of each image file in the folder. However, this feature provides only a means to preview thumbnails of digital images and is not applicable to other files types. Further, users may not edit or resave the images.

It is therefore desired to provide an improved system and method for navigating files in a directory.

SUMMARY OF THE INVENTION

According, it is an object of the present invention to provide a system for easily opening, displaying, and editing a plurality of files in a directory. It is a further object of the present invention to provide a system and method for sequentially opening and displaying a plurality of electronic files.

These and other objectives are achieved by providing a system for sequentially opening and displaying files in a directory, including a processor, at least one directory including a plurality of electronic files, software executing on the processor for receiving a request to open and display a first one of the plurality of electronic files, software executing on the processor for receiving a next file request, and software executing on the processor for opening a next file in the at least one directory upon receiving the next file request.

In some embodiments, the system includes software for receiving another next file request, and software for opening another next file in the at least one directory via a user interface upon receiving the another next file request. In some embodiments the system also includes software for closing one or more of the plurality of electronic files after a predetermined number of next file requests. In some embodiments the system also includes a file selector module displayable on a user interface for receiving the next request, includes at least one of a next file option, a previous file option, and a change directory option.

Further objects of the present invention are achieved by providing a system for sequentially opening and displaying files in a directory, including at least one directory including a plurality of electronic files, file access software executing on at least one computer for opening and displaying at least one of the plurality of electronic files, and a file selector module for receiving a next file request, wherein the file access software opens a next file in the at least one directory via the user interface upon receiving the next file request.

In some embodiments, the file access software closes one or more opened ones of the files after a predetermined number of next file requests. In some embodiments, the file access software also opens two or more next files in the at least one directory upon receiving the next file request. The plurality of electronic files may be sorted in a particular order wherein the file access software opens the next file in the particular order.

Further objects of the present invention are achieved by providing a method for sequentially opening and displaying files in a directory, including the steps of receiving a user request to access at least one directory, the directory including a plurality of electronic files, receiving a user input to a file selector module indicative of a request to open and display at least one of the plurality of the files, opening and displaying a first file of the plurality of electronic files via a user interface, receiving a user input to the file selector module indicative of a request to open a next one of the plurality of electronic files, opening and displaying a next file in the at least one directory via the user interface, and closing the first file upon receiving a predetermined number of requests to open a next one. In some embodiments, the plurality of electronic files include two or more file types and the step of opening the next file includes opening the next file having a predetermined file type.

Other objects of the invention and its particular features and advantages will become more apparent from consideration of the following drawings and accompanying detailed description.

DETAILED DESCRIPTION OF THE INVENTION

Figure 1:
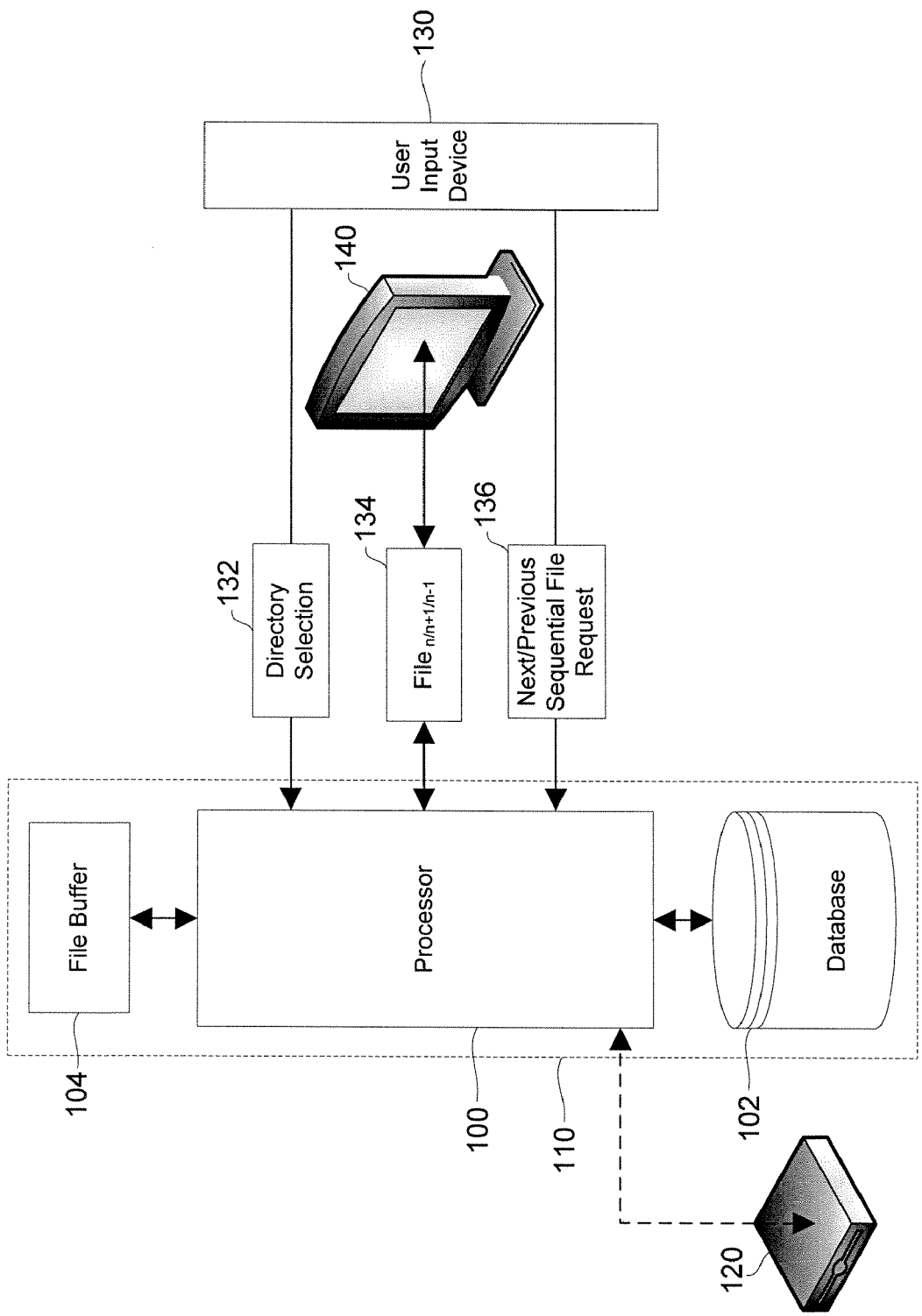
FIG. 1 is a schematic view of a system for sequentially opening and displaying electronic files in a directory according to an exemplary embodiment of the present invention.

FIG. 1 shows an exemplary system for sequentially opening and displaying files stored and/or organized in a directory. The system includes at least one processor 100. The processor 100 may be any device, system or part thereof that controls at least one operation and/or executes software applications. The processor 100 may be implemented in hardware, firmware or software, or some combination of at least two of the same. It should be noted that the functionality associated with any particular processor may be centralized or distributed, whether locally or remotely. In some embodiments, the processor 100 is included in a server 110.

The system further includes one or more databases 102. The databases 102 may be local to the processor 100 and/or server 110, or distributed and remote to the processor 100. For example, the databases 102 may be included on any hard disk or hard drive, an external storage device and/or portable media, such as a compact disc ("CD") or digital versatile disc ("DVD") accessible by a portable media device 120. The databases 102 include any number of directories and subdirectories including a plurality of electronic files accessible by the system, shown in FIGS. 2A and 2B. The files may be any electronic files of a particular type or many different types. As one of ordinary skill in the art will understand, each particular file type may be indicative of one or more applications able to open and display the particular file.

The system further includes software for receiving a directory selection 132 indicative of one of a plurality of directories of electronic files. For example, a user may select a directory by any known means via a user input device 130 (e.g., keyboard, mouse, touch screen, etc). Upon a directory selection, the system may optionally auto-open and display a first one of the files 134 in the selected directory. Each file is preferably opened and displayed in the file's native or default program (e.g., according to its file extension). Alternatively, the system may await a user input indicative of a request to open a first one of the files 134. For example, the system may include software for receiving a request to open and display at least one of the electronic files. A user may select a particular file as the first file, or may submit a next file request 136 to open the first file in the directory (e.g., in a sort order).

Figure 3:
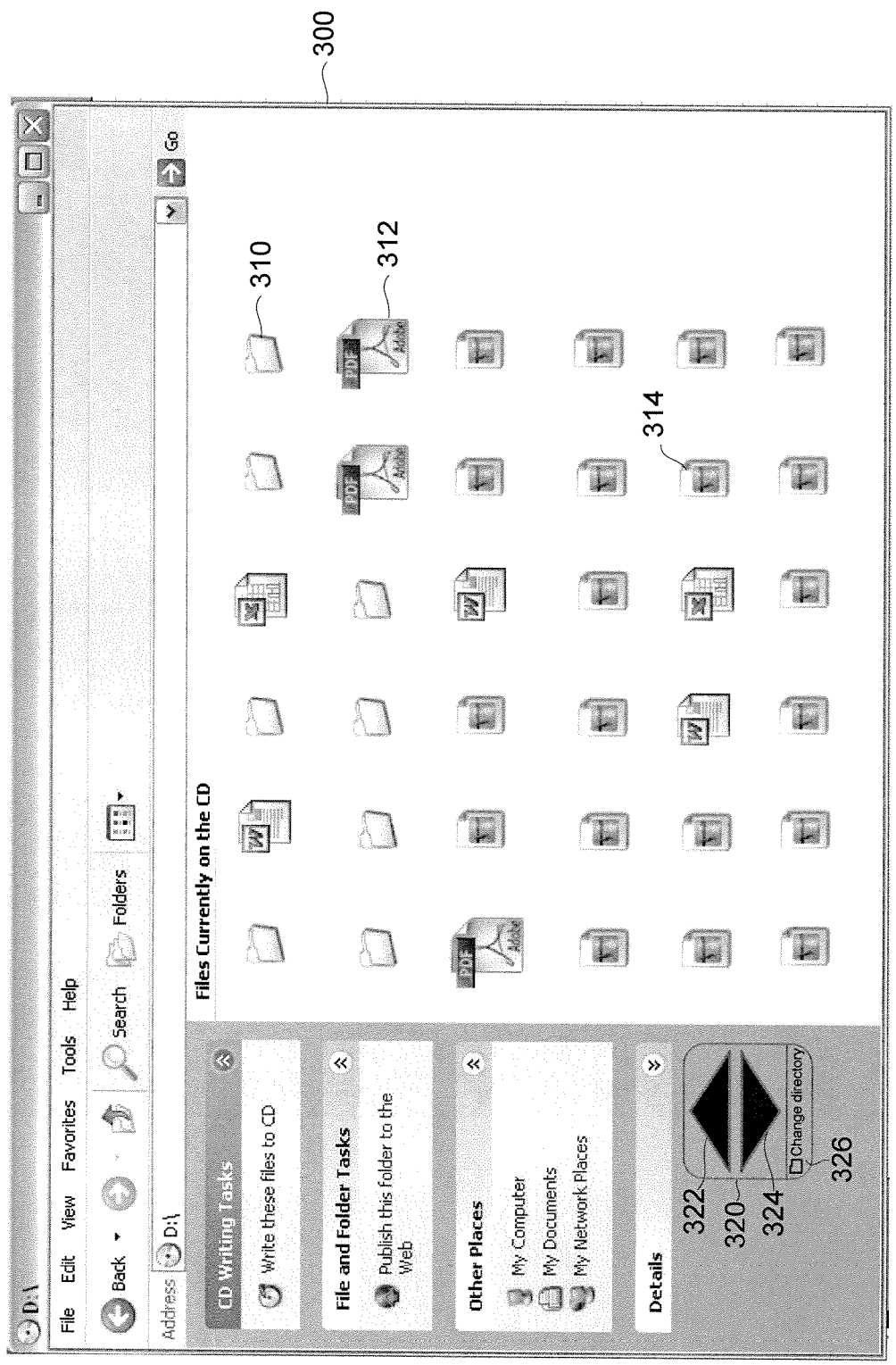
FIG. 3 illustrates an exemplary display generated by the system shown in FIGS. 1-2B.
Figure 4:
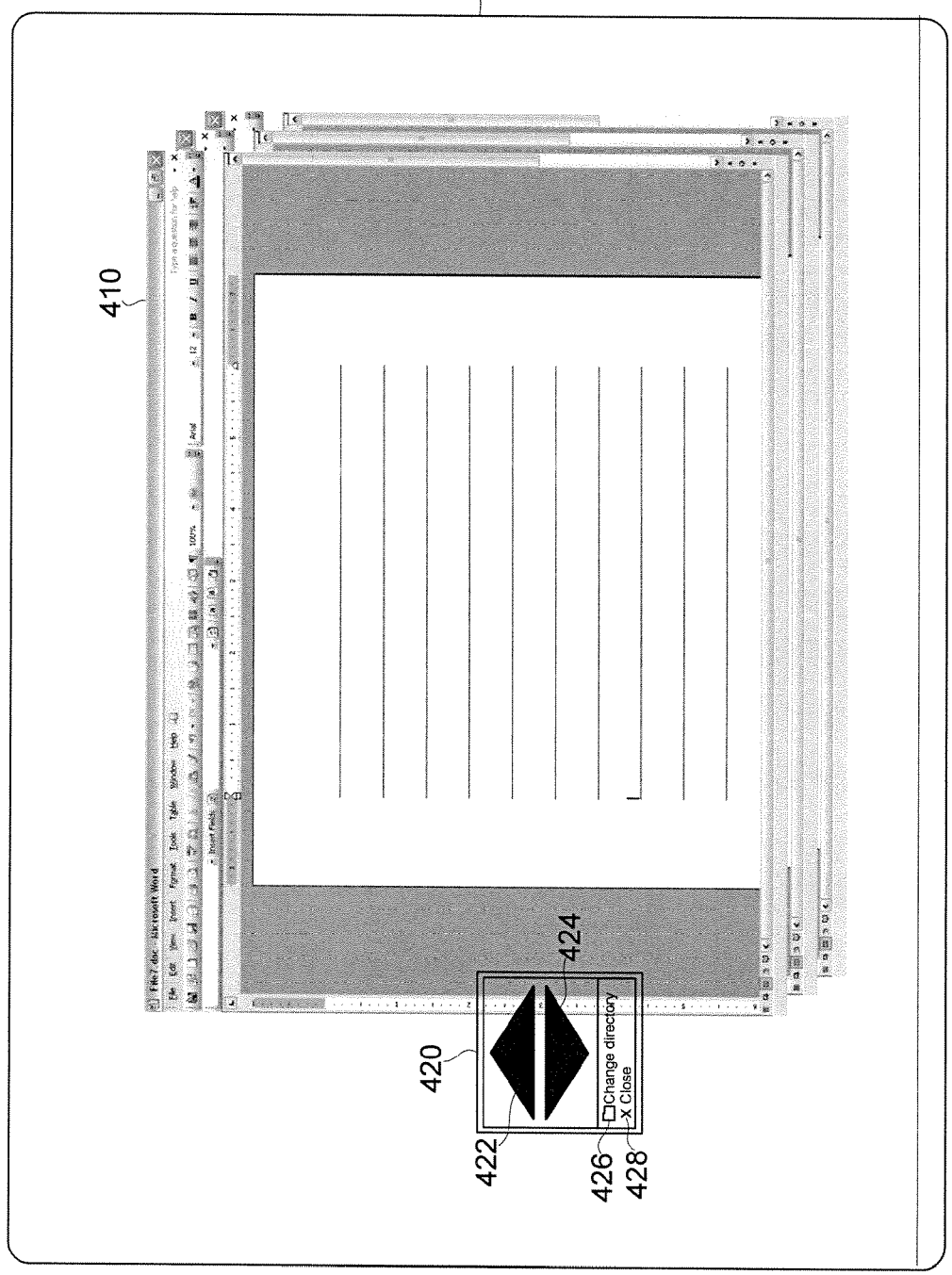
FIG. 4 illustrates another exemplary display generated by the system shown in FIGS. 1-2B.

The system also includes software (e.g., file access software) for receiving a next file request and/or previous file request 136. The next and previous file requests 136 are preferably received via a file selection module 320/420, examples of which are shown in FIGS. 3 and 4. Upon a next request, the system opens and displays a subsequent or next file in the directory (e.g., via the user interface 140). For each next file request, the system opens and displays the next sequential file 134 (e.g., n+1) in the directory, e.g., according to a sort order and/or order of appearance in the directory. Therefore, a user may rapidly scroll through a plurality of files without having to choose which to open (e.g., based on a file name or designator) and without having to select and/or click on a separate link for each file. Each open file may be viewed and also edited, saved, deleted, copied, etc. as desired. Upon receiving a previous file request 136, the system displays the previous electronic file 134 (e.g., n−1) to be opened. For example, a predetermined number of opened files from the directory may be temporality stored in a file buffer 104. As such, a previous file request retrieves the last opened file from the buffer 104.

Figure 2A:
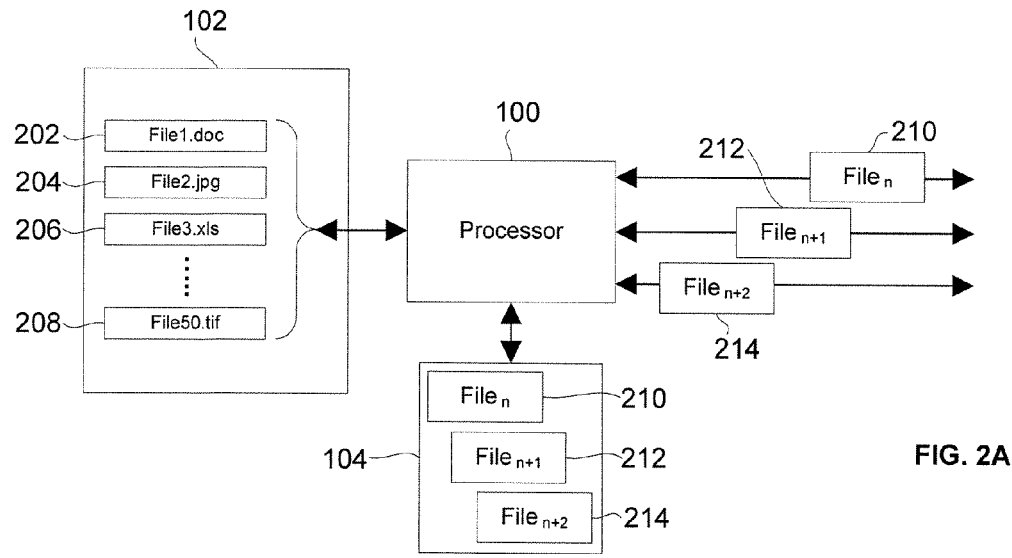
FIG. 2A is another schematic view of the system shown in FIG. 1.
Figure 2B:
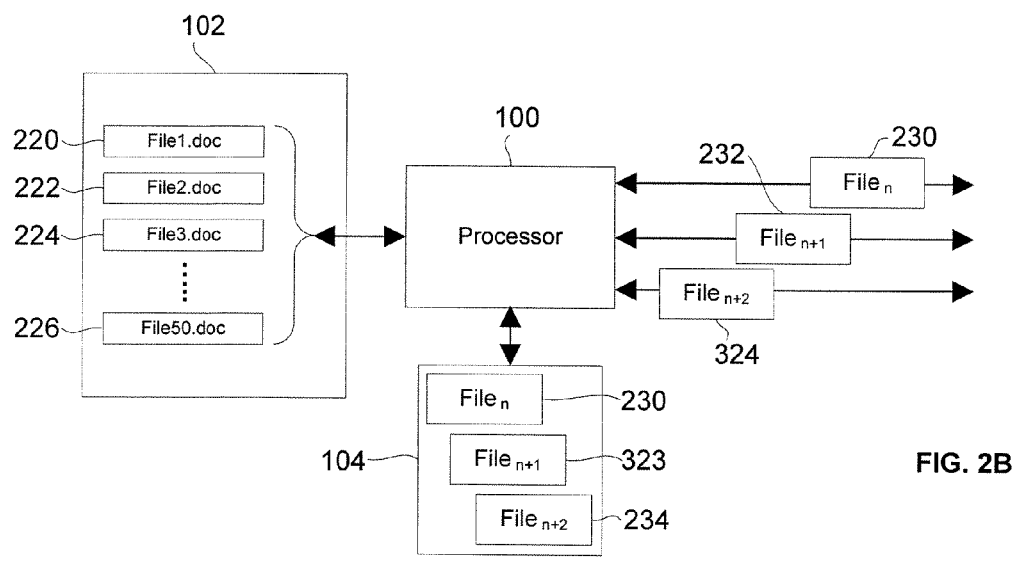
FIG. 2B is another schematic view of the system shown in FIG. 1.

FIGS. 2A and 2B show additional views of an exemplary system according to the present invention including the file buffer 104. As shown, the databases 102 and/or directories may include any number of files or documents of different file types or the same file type. The files are provided sequentially in response to successive next file requests 136 from user. In some embodiments, only files of a particular type from the directory are opened and displayed. A predetermined number of the electronic files may be maintained in the file buffer 104 and displayed upon receipt of a previous file request. It should be noted that while three (3) open files are shown in the file buffer 104, a user and/or the system may determine or set any number of files to remain open.

The system further includes software for closing one or more of the plurality of electronic files after a predetermined number of next file requests. For example, as a user scrolls or steps through files in the directory, i.e., via a series of next file requests, the oldest file is closed in order to maintain the predetermined number of files in the buffer 104. Therefore, a user may scroll through any number of files without each file remaining open on the user interface 140 and without requiring the user to manually close the oldest file(s). By provision of the file buffer 104 however, the user may return to the last predetermined number of opened files and review, edit, delete, cut/copy and paste text or images therefrom, etc. as desired.

FIGS. 3 and 4 show exemplary displays generated at least in part by the system according to the present invention. As shown in FIG. 3, a file selector module 320 may be embedded in a directory window or display 300. The file selector module 320 includes a next file selector 322 and a previous file selector 324 (or vise versa). Using the file selector module 320, a user may scroll or step through each of the files (e.g., 312, 314) in the directory and/or selected subfolders (e.g., 310) in the directory. Each file is preferably opened and displayed in its native or default program (e.g., Word, Excel, WordPerfect, Adobe Acrobat, PowerPoint, etc.) The exemplary file selector module 320 further includes a selector 326 to change directories if desired.

Shown in FIG. 4, the file selector module 420 may be provided in a separate window or box on the user interface 140. For example, upon the opening or selection of a particular directory, the file selector module 420 may appear and remain in front of all other displayed windows. In the example of FIG. 4, only the present opened files (e.g., 410) are shown in the user interface and not a directory window showing a list and/or icons of files in the directory; however the directory window may also be shown if desired. As one of ordinary skill in the art will understand, a user may further move the file selector module 420 or otherwise adjust its position in the display 400 as desired. A user may also close the file selector module 420 (e.g., via a close selector 428). For example, upon locating one particular file in the directory that the user intends to edit for an extended period of time, the user may close the file selector module 420 until such time as he/she would like to further scroll through the files and/or documents in one or more directories.

Figure 5:
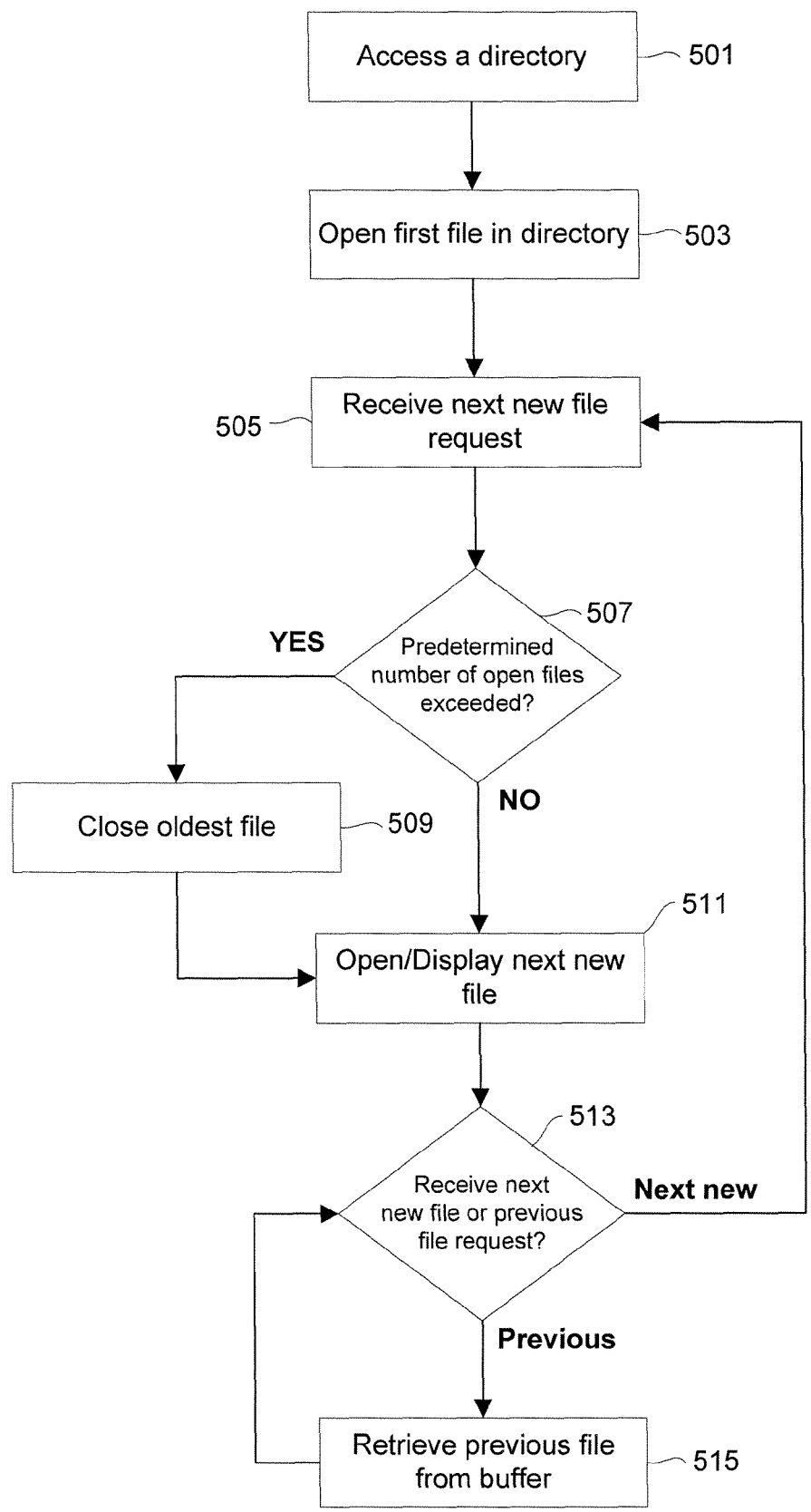
FIG. 5 illustrates an exemplary method of opening and displaying a plurality of electronic files in a directory.
Figure 6:
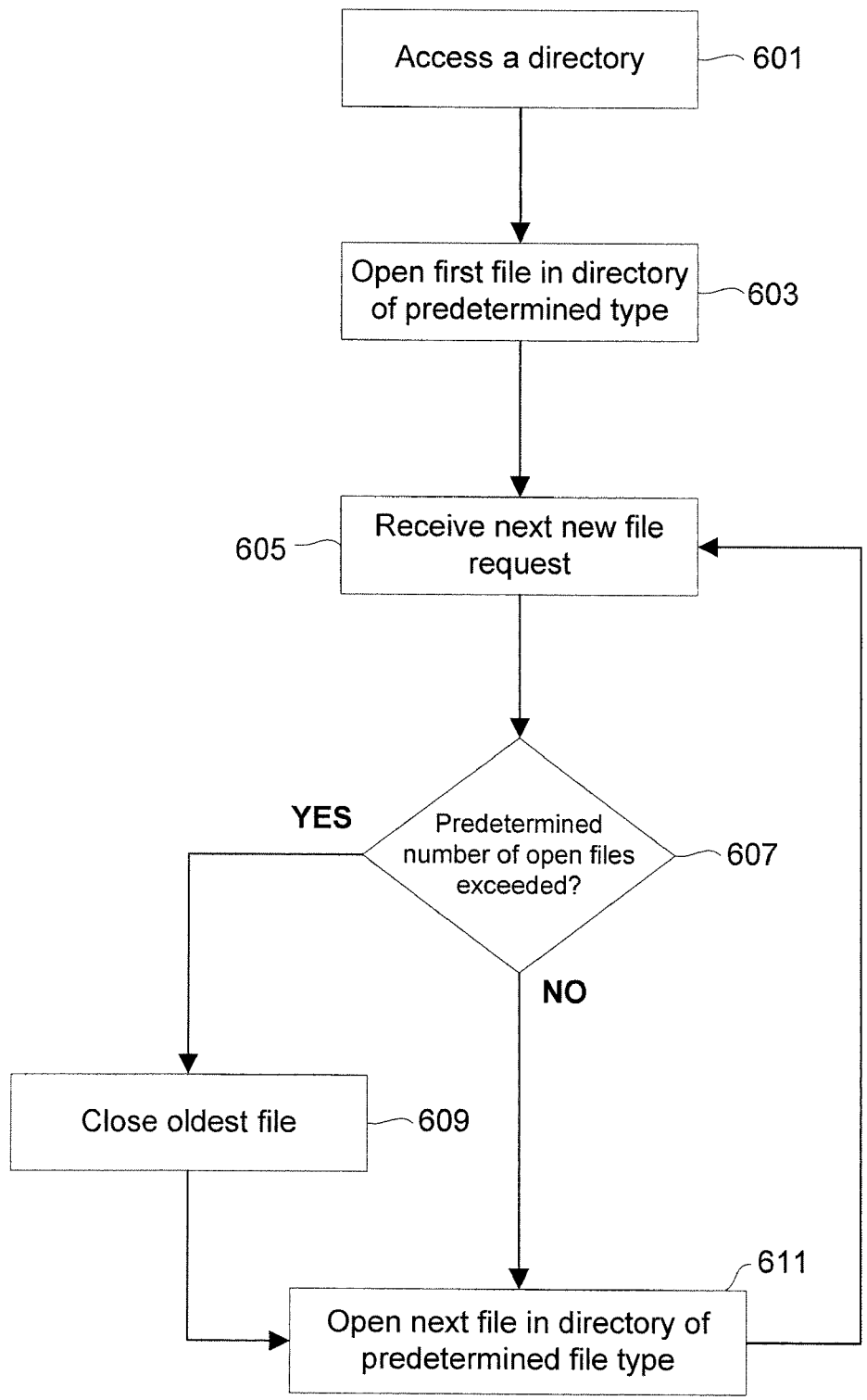
FIG. 6 illustrates another exemplary method of opening and displaying a plurality of electronic files in a directory.

FIGS. 5 and 6 show exemplary methods of opening and displaying a plurality of electronic files in a directory. Referring now to FIG. 5, the method includes accessing or selecting a directory (step 501). Next, a first file in the directory is opened (step 503). The first file may be automatically opened and displayed by the system upon the selection of a directory, or manually opened by a user. The method further includes receiving any number of next file requests (step 505). If a predetermined number of files from the directory have been opened (e.g., and temporarily stored in the file buffer 104), the oldest file in the buffer is closed (steps 507-509). Next, a next new file is opened and displayed (step 511). Any number of additional next file requests and/or previous file requests may be received (step 513). If a previous file is requested (i.e., via a previous file request to the file selector module), the electronic file previously opened is retrieved from the buffer and again displayed. If a next new file is requested, the system again determining whether a predetermined number of files already exist in the buffer and proceeds accordingly as described above.

Referring now to FIG. 6, a method of opening and displaying only files of a particular type is shown. Upon accessing a directory, a first file of a particular type is opened and displayed (steps 601-603). The type may be pre-selected by the user and/or stored as a system setting. Alternatively, the user may manually select a first file of a desired type to open. Upon receiving additional next file requests, next files of the desired type are then opened from the directory and displayed. As described with reference to FIG. 5, the oldest file may be closed as the user scrolls through the files or documents of the chosen directory.

Although the invention has been described with reference to a particular arrangement of parts, features and the like, these are not intended to exhaust all possible arrangements or features, and indeed many modifications and variations will be ascertainable to those of skill in the art.

What is claimed is:

1. A system for sequentially opening and displaying files in a directory, comprising:
   a processor;
   at least one directory comprising a plurality of electronic files arranged in an order;
   software executing on said processor for receiving a request to open and display a first one of the plurality of electronic files;
   software executing on said processor for receiving a next file request; software executing on said processor for opening and displaying a next file in the order from said at least one directory upon receiving the next file request; and
   software executing on said processor for closing one or more of the plurality of electronic files based on a predetermined number of next file opening requests.

2. The system according to claim 1, further comprising:
   software executing on said processor for displaying a last opened one of the plurality of electronic files upon receiving a previous file request.

3. The system according to claim 2, wherein the last opened one is retrieved from a buffer.

4. The system according to claim 1, further comprising:
   software executing on said processor for receiving another next file request; and
   software executing on said processor for opening a subsequent next file in said at least one directory upon receiving the another next file request.

5. The system according to claim 1, further comprising:
   software executing on said processor for receiving a directory request to change the at least one directory to a second directory, wherein said software for opening a next file opens a next file in the second directory.

6. The system according to claim 1, further comprising:
   a file selector module displayable on a user interface for receiving the next request.

7. The system according to claim 6, wherein said file selector module includes at least one of a next file option and a previous file option.

8. The system according to claim 7, wherein said file selector module includes a change directory option.

9. The system according to claim 1, wherein said software for receiving a request to open and display a first one opens and displays the first one automatically upon receiving a directory selection.

10. The system according to claim 1, wherein said at least one directory includes a plurality of subdirectories, wherein said system further comprises software executing on said processor for receiving a directory selection indicative of one of the plurality of subdirectories.

11. The system according to claim 1, wherein each of the first one of the plurality of files and the next one of the plurality of files is opened via an application corresponding to the particular file.

12. The system according to claim 1, wherein said software for opening a next file opens two or more next files in said at least one directory.

13. A system for sequentially opening and displaying files in a directory, comprising:
    at least one directory comprising a plurality of electronic files arranged in an order;
    file access software executing on at least one computer for opening and displaying at least one of the plurality of electronic files via a user interface; and a file selector module for receiving a next file request,
    wherein said file access software opens and displays a next file in the order from said at least one directory via the user interface upon receiving the next file request; and
    wherein said file access software closes one or more opened ones of the plurality of files after a predetermined number of next file opening requests.

14. The system according to claim 13, wherein said file selector module is displayed on a user interface of the at least one computer, where said file selector module includes at least one of a next file option and a previous file option.

15. The system according to claim 13, wherein the next file is opened in an application corresponding to a file type of the next file.

16. The system according to claim 13, wherein said file access software opens two or more next files in said at least one directory upon receiving the next file request.

17. The system according to claim 13, wherein said file selector module further receives a previous file request; wherein said file access software displays an opened one of the plurality of electronic files upon receiving the previous file request.

18. The system according to claim 13, wherein said file access software opens and displays the next file.

19. A method for sequentially opening and displaying files in a directory, comprising the steps of:
    receiving a user request to access at least one directory, the directory including a plurality of electronic files arranged in an order;
    receiving a user input to a file selector module indicative of a request to open and display at least one of the plurality of the files;
    opening and displaying a first file of the plurality of electronic files via a user interface;

receiving a user input to the file selector module indicative of a request to open a next one of the plurality of electronic files;

opening and displaying a next file in the order from the at least one directory via the user interface; and closing the first file upon receiving a predetermined number of requests to open a next one.

20. The method according to claim 19, wherein the plurality of electronic files include two or more file types.

21. The method according to claim 20, wherein said step of opening the next file includes opening the next file of a predetermined file type.

22. The method according to claim 20, wherein each of the plurality of electronic files is opened in an application corresponding to its file type.

23. The method according to claim 19, further comprising the step of:

redisplaying the first file upon receiving a user input to the file selector module indicative of a previous file request.

* * * * *